Dec. 10, 1940.   W. S. RENDALL   2,224,488
GLASS BRICK AND METHOD OF AND APPARATUS FOR MAKING THE SAME
Filed Oct. 29, 1936   2 Sheets-Sheet 1
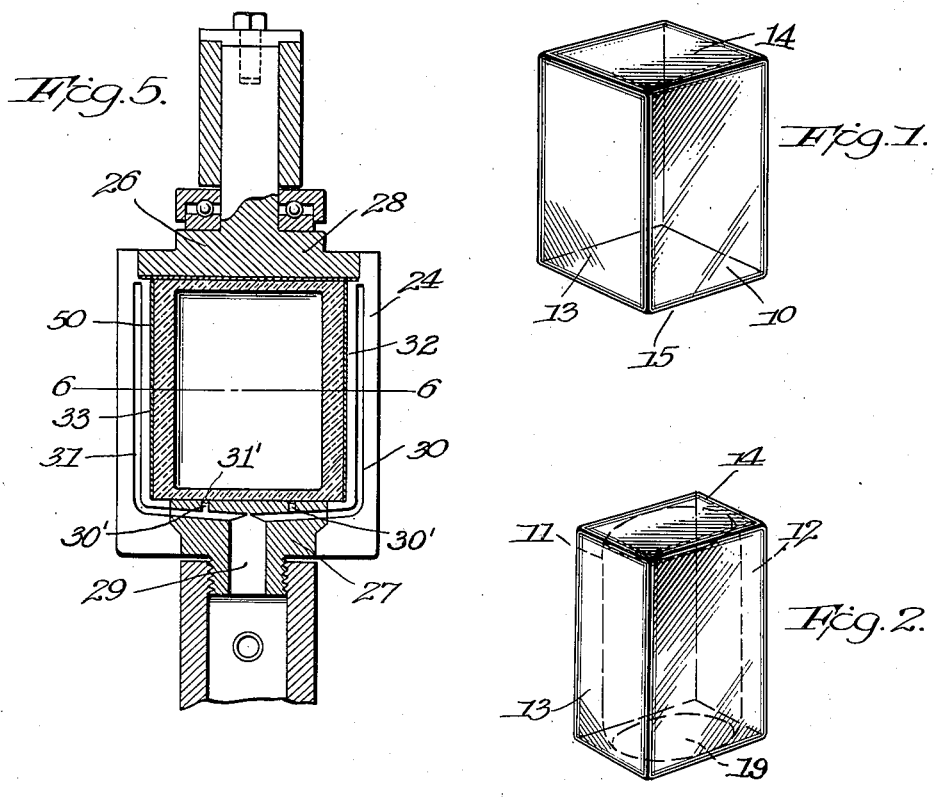
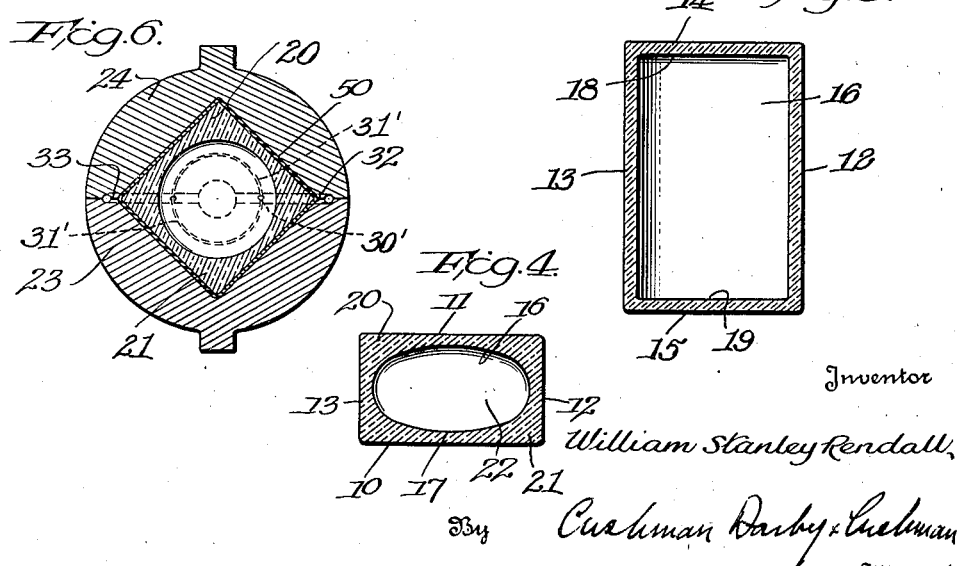
Inventor
William Stanley Rendall,
By Cushman Darby & Cushman
Attorneys

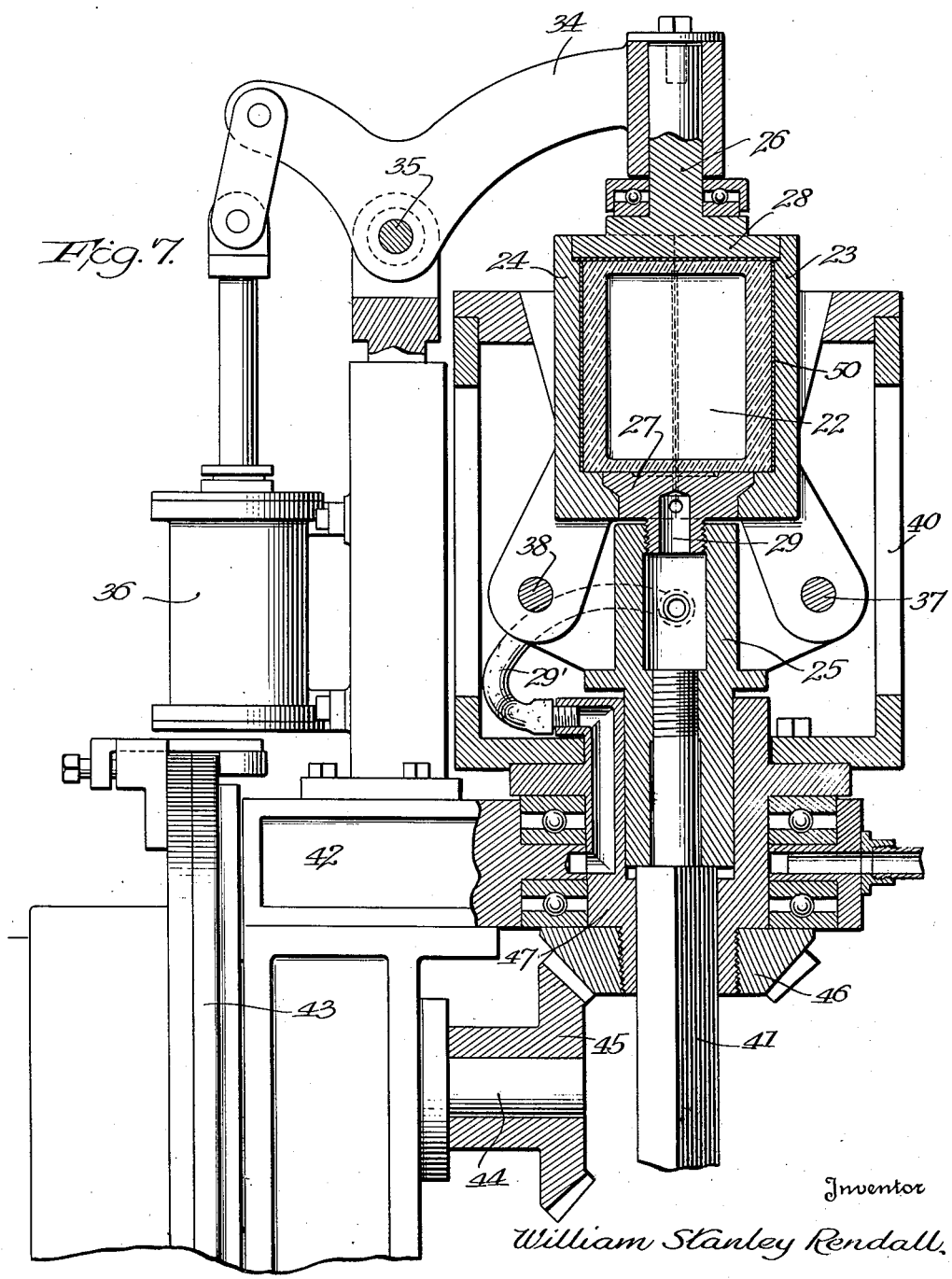

Patented Dec. 10, 1940

2,224,488

UNITED STATES PATENT OFFICE 2,224,488

GLASS BRICK AND METHOD OF AND APPARATUS FOR MAKING THE SAME

William Stanley Rendall, Baltimore, Md., assignor to Crown Cork & Seal Company, Inc., Baltimore, Md., a corporation of New York Application October 29, 1936, Serial No. 108,274

10 Claims. (Cl. 49—29)

This invention relates to a hollow glass article and to a method and apparatus for making the same. More particularly, the invention contemplates, as a new article of manufacture, a hollow glass brick, adapted for use in building structures, characterized by the presence of a partial vacuum in its hollow interior. The invention also contemplates a method of and an apparatus for making such an article in a novel and expeditious manner.

Glass bricks for building purposes have heretofore been made by pressing or otherwise forming two dish-shaped members from molten glass, and then cementing the pieces together to form a hollow brick. Alternatively, hollow glass bricks have been made by blowing operations similar to those employed in the manufacture of glass bottles. In the latter method it has been necessary to remove the blowing neck and close the blow opening.

It is an object of the present invention to produce a hollow glass brick characterized by the absence of seams or joints or blow openings, such as have been found to be indispensable in the prior art. It is a further object of the invention to produce a glass brick having high heat insulating properties. The latter object is accomplished by providing a glass brick having the hollow interior space filled with air at less than atmospheric pressure; in other words, a partial vacuum.

It is a further object of the invention to provide a simple and expeditious method of and apparatus for making such a brick. Preferably, the latter object is accomplished by the use of centrifugal force in forming a gob or gather of glass into brick form. Thus, by the present invention, the use of high pressure blowing air internally of the brick, is avoided. On the contrary, the hollow interior of the brick made in accordance with the present invention is filled, during the manufacturing operation, with highly heated air at atmospheric pressure, so that, when the brick cools down, and the interior air contracts, the hollow interior of the brick will comprise a partial vacuum.

The invention also contemplates means preventing collapse of the walls of the brick during the cooling and contraction of the air entrapped interiorly of the brick.

In the drawings:

Figure 1 is a perspective view of a glass brick.

Figure 2 is a phantom perspective view of a hollow brick in accordance with the present invention.

Figure 3 is a vertical section of the brick of Figure 2 on a plane parallel to the front and rear faces thereof.

Figure 4 is a horizontal section of the brick of Figure 2.

Figure 5 is a sectional view of a mold and its supporting means.

Figure 6 is a horizontal section on line 6—6 of Figure 5.

Figure 7 is a vertical sectional view of an apparatus for making the article shown in Figures 1 to 4.

Glass brick of the present invention may be of any desired size and may have any preferred proportion of dimensions. As shown in Figures 1 and 2, the surfaces of the brick are of substantially conventional proportions comprising front and back side surfaces 10, 11, right and left side faces 12, 13 and end faces 14, 15. The exterior surface of the brick is thus in the form of a rectangular parallelepiped or a rectangular solid. The hollow space 22 within the interior of the brick is defined by curved cylindrical surfaces 16, 17, and by substantially plane surfaces 18, 19, with the result that the wall structure of the brick is thickened as at 20, 21, adjacent the vertical edges of the brick. The hollow interior space within the brick will be generally cylindrical in shape. If the ends of the exterior of the brick are squares, the interior will be a circular cylinder; if not, then the interior will be an elliptical or oval cylinder.

As pointed out above, the interior space 22 will be filled with rarefied air, or a partial vacuum. The manner in which this result is accomplished will now be described.

A portable mold comprising sections 23, 24, is mounted for rotation about a vertical axis on upper and lower spindles 25, 26. The lower spindle supports a mold bottom plate 27, and the upper spindle carries a mold top closure plate 28. The lower spindle and the plate 27 are provided with a vacuum passage 29 communicating with grooves 30, 31 formed on the meeting faces of the mold sections, whereby suction may be applied to the interior of the mold through the cracks 32, 33 (Fig. 6). Suction is also applied to the bottom plate through orifices 30' and the groove 31'.

As shown in Figure 7, the top cover plate 28 for the mold is mounted on the end of a lever 34 pivoted at 35 and controlled by an air motor 36, whereby the cover plate may be removed upon the appropriate admission of compressed air to the motor. The mold sections 23, 24 are pivotally supported at 37, 38 in a cage 40. Opening and closing of the mold sections is effected by longitudinal movement of the shaft 41, which moves the mold sections and their holders outwardly with respect to the cage, whereby they are pivoted to open position. Longitudinal movement is imparted to the shaft 41 by an air motor connected to the lower end thereof, not shown.

The cage 40 is supported by appropriate bearings on a bracket 42, projecting laterally from a rotatable face plate 43. Spinning motion is imparted to the cage and mold by a horizontally disposed drive shaft 44, pinions 45, 46 and sleeve 47 carrying spindle 25.

Thus, rotation about a vertical axis may be imparted to the mold, and the mold and its supporting means may be swung downwardly about the axis of shaft 44, upon rotation of the face plate 43 with respect to the other parts of the machine. The means for rotating the mold, for revolving it about the shaft 44, and the general organization of the machine is not claimed in this application, and for a more complete disclosure of the same, reference is made to the copending application of S. Winder, Serial No. 149,991 filed June 23, 1937.

An important feature of the apparatus of the present invention is the provision of a lining 50 of heat insulating material on the inner molding faces of the mold. Although in some cases such a lining is not necessary, it is usually desirable to provide some means for preventing undue chilling of the glass when it is first placed in the mold. In other words, the glass should be kept in a molten state for a sufficient length of time to permit it to flow over all of the interior surfaces of the mold. In order to accomplish this result, it is preferred to use a lining of heat insulating material, so that the chilling of the glass is retarded. A suitable lining material is known to the trade as "African Black Wax" such as is used in the paste mold art.

In the operation of the machine of the present application, and in performing the method of this invention, the machine is at rest with the top plate 28 raised. A gob or gather of glass, preferably of a temperature within 50° of 2550° F. is placed in the mold, by any suitable feeding mechanism. The mold is closed, and rotation is then imparted thereto by the drive shaft 44. Suction is simultaneously or subsequently applied to the vacuum passages 29, 30 etc. As the mold spins, the centrifugal force will cause the molten glass to flow outwardly and upwardly along the surfaces of the mold. If desired, the mold and its supporting cage are revolved about the axis of the shaft 44 so that the top plate 28 assumes a position below the mold. Such rotation of the mold assists in the even distribution of the glass and the glass will now cover all of the surfaces of the mold, leaving the hollow space 22 completely enclosed and filled with highly heated air of substantially the same temperature as the molten glass. The lining 50 facilitates the distribution of the glass within the mold. As the glass cools, the air in the hollow interior 22 will also cool and contract, and it is desirable to prevent external atmospheric pressure from collapsing the walls of the brick. Preferably, the vacuum produced by suction through the grooves 30, 31 and port 29 and pipe 29' is utilized to effect this result. In the alternative, however, the collapse of the walls may be prevented by continuing the spinning of the mold and thereby continuing the effect of centrifugal force, until the glass has solidified sufficiently to withstand the differential in internal and external air pressures.

After the brick has been formed and the glass in the wall structure thereof has become sufficiently set to withstand this collapsing tendency, the cover plate 28 is removed by the air motor 36, and the shaft 41 is projected longitudinally outwardly to open the mold sections and discharge the completed brick from the mold.

Thus, a hollow glass brick having a partial vacuum in its interior surface is produced.

The present invention is not limited to the details of construction or to the specific method steps described above, but covers all articles, methods, and machines coming within the scope of the appended claims or their equivalent.

I claim:

1. A centrifugally cast, glass brick comprising continuous gas impervious walls defining a single hollow interior space, the exterior surfaces of said brick being in the form of a rectangular parallelepiped and the interior surfaces of said brick defining the hollow interior having been shaped by the influence of centrifugal force and being substantially in the form of a cylinder, thereby providing thickened walls at certain of the edges of the brick and interiorly arched wall structures therebetween.

2. A centrifugally cast, glass brick comprising continuous gas impervious walls shaped under the influence of centrifugal force when the glass was plastic, the exterior surface of said brick being in the form of a rectangular solid and the interior surfaces of said brick defining a single hollow interior, and being substantially in the form of an oval cylinder, thereby providing thickened corners at the vertical edges of the brick and arched wall structures therebetween.

3. A centrifugally cast, glass brick comprising continuous gas impervious walls defining a single hollow interior space, the exterior surfaces of said brick being in the form of a rectangular solid, the interior surfaces of said brick opposite the exterior side walls being substantially cylindrical and providing arched wall structures, and the interior surfaces opposite the exterior end walls being substantially plane.

4. A centrifugally cast, glass brick comprising continuous gas impervious walls defining a single hollow interior space containing a partial vacuum, the side walls of said brick having substantially plane exterior surfaces, and curved, cylindrical interior surfaces providing arched wall structures adapted to withstand the collapsing pressure of external atmosphere on said side walls.

5. The method of making a hollow glass brick having a partial vacuum in its interior, comprising placing a quantity of molten glass in a mold, subjecting the same to the combined influence of centrifugal and gravitational forces, thereby forming a continuously walled body of molten glass enclosing and entrapping a quantity of highly heated air at substantially atmospheric pressure, cooling and solidifying the molten glass and cooling and contracting the entrapped quantity of air to form a partial vacuum in said brick.

6. The method of making a closed hollow glass brick comprising placing a quantity of glass in a closed rectangular mold, spinning the mold and the glass about an axis of the mold and inverting the mold by rotation about an axis at right angles thereto, thereby expanding the glass by the combined influences of centrifugal and gravitational forces to cause the exterior surface of the glass to follow continuously the shape of the mold and its interior surface to follow a generally cylindrical shape, and preventing collapse of the walls of the brick during the cooling of the glass and of the entrapped air.

7. An apparatus for making a hollow glass brick comprising a mold having a brick-shaped cavity, said mold being mounted for rotation about the longitudinal axis of said cavity and for inversion about an axis disposed transversely with respect thereto, means for rotating the mold about said longitudinal axis and for inverting the mold, to cause molten glass placed therein to cover the surfaces of the mold by coaction of centrifugal and gravitational forces, and means for preventing collapse of the glass upon cooling of the entrapped air in the brick.

8. An apparatus for making a hollow glass brick comprising a mold having a brick-shaped cavity, said mold being mounted for rotation about the longitudinal axis of said cavity and for inversion about an axis disposed transversely with respect thereto, means for rotating the mold about said longitudinal axis and for inverting the mold, to cause molten glass placed therein to cover the surfaces of the mold by coaction of centrifugal and gravitational forces, and means for applying suction to the exterior surfaces of the brick in the mold to hold said surfaces in contact with the mold surfaces and to prevent collapse of the brick during cooling thereof.

9. An apparatus for forming a hollow glass brick having imperforate side walls and a single hollow interior chamber filled with a partial vacuum, comprising a mold having a brick-shaped interior molding cavity, means for rotating the mold to subject a charge of glass therein to centrifugal force, suction passages formed in the mold, and means for applying suction to the surfaces of the brick through said passages to maintain the surfaces of the brick in contact with the mold surfaces, thereby to prevent collapse of the brick during the cooling and contracting of the heated air in the interior thereof.

10. The method of making a hollow glass article having a partial vacuum sealed in its interior, which comprises depositing a charge of glass in a mold, rotating the mold about its vertical axis and thereby subjecting the glass to centrifugal force, inverting the mold about its horizontal axis and thereby subjecting the glass to gravitational force, thus flowing the glass over the interior surface of the mold by the combined influences of said forces and forming a continuously walled article completely enclosing a body of highly heated air at atmospheric pressure, cooling the molten glass and holding the same in contact with the surfaces of the mold during said cooling, until the glass has solidified sufficiently to withstand the collapsing force resulting from the contraction of said heated air.

WILLIAM STANLEY RENDALL.